(12) United States Patent
Youmans

(10) Patent No.: US 10,901,433 B2
(45) Date of Patent: *Jan. 26, 2021

(54) CONTROL AND STABILIZATION OF A FLIGHT VEHICLE FROM A DETECTED PERTURBATION BY TILT AND ROTATION

(71) Applicant: Thomas A. Youmans, Los Angeles, CA (US)

(72) Inventor: Thomas A. Youmans, Los Angeles, CA (US)

( * ) Notice: Subject to any disclaimer, the term of this patent is extended or adjusted under 35 U.S.C. 154(b) by 318 days.

This patent is subject to a terminal disclaimer.

(21) Appl. No.: 15/935,689

(22) Filed: Mar. 26, 2018

(65) Prior Publication Data

US 2018/0284814 A1 Oct. 4, 2018
US 2019/0258273 A9 Aug. 22, 2019

Related U.S. Application Data

(63) Continuation of application No. 15/091,566, filed on Apr. 5, 2016, now Pat. No. 9,946,267.
(Continued)

(51) Int. Cl.
*G05D 1/08* (2006.01)
*B64C 27/08* (2006.01)
(Continued)

(52) U.S. Cl.
CPC ......... *G05D 1/0816* (2013.01); *B64C 17/02* (2013.01); *B64C 19/00* (2013.01); *B64C 27/08* (2013.01);
(Continued)

(58) Field of Classification Search
None
See application file for complete search history.

(56) References Cited

U.S. PATENT DOCUMENTS 9,550,561 B1 * 1/2017 Beckman ............... B64C 17/00
10,029,786 B1 * 7/2018 Adams ................... B64D 17/30
(Continued)

FOREIGN PATENT DOCUMENTS

CA 2838535 A1 7/2015
WO 2013158050 A1 10/2013
WO 2014198642 A1 12/2014

OTHER PUBLICATIONS

Stepaniak, Michael J; A Quadrotor Sensor Platform; Doctoral Dissertation Presented at Russ College of Engineering and Technology, Ohio University; Nov. 2008.
(Continued)

*Primary Examiner* — Lail A Kleinman
(74) *Attorney, Agent, or Firm* — Smith, Gambrell & Russell, LLP

(57) ABSTRACT

A flight vehicle control and stabilization process detects and measures an orientation of a non-fixed portion relative to a fixed frame or portion of a flight vehicle, following a perturbation in the non-fixed portion from one or both of tilt and rotation thereof. A pilot or rider tilts or rotates the non-fixed portion, or both, to intentionally adjust the orientation and effect a change in the flight vehicle's direction. The flight vehicle control and stabilization process calculates a directional adjustment of the rest of the flight vehicle from this perturbation and induces the fixed portion to re-orient itself with the non-fixed portion to effect control and stability of the flight vehicle. The flight vehicle control and stabilization process also detects changes in speed and altitude, and includes stabilization components to adjust flight vehicle operation from unintentional payload movement on the non-fixed portion.

23 Claims, 5 Drawing Sheets

Related U.S. Application Data

(60) Provisional application No. 62/143,610, filed on Apr. 6, 2015.

(51) Int. Cl.
| | | |
|---|---|---|
| *B64C 17/02* | (2006.01) | |
| *B64C 19/00* | (2006.01) | |
| *B64C 39/02* | (2006.01) | |
| *G05D 1/04* | (2006.01) | |
| *B64C 27/00* | (2006.01) | |
| *B64C 29/00* | (2006.01) | |

(52) U.S. Cl.
CPC .......... *B64C 39/024* (2013.01); *B64C 39/026* (2013.01); *G05D 1/042* (2013.01); *G05D 1/08* (2013.01); *G05D 1/0808* (2013.01); *G05D 1/0858* (2013.01); *B64C 27/00* (2013.01); *B64C 29/00* (2013.01); *B64C 2201/14* (2013.01)

(56) References Cited

U.S. PATENT DOCUMENTS

| | | | | |
|---|---|---|---|---|
| 2004/0089763 | A1* | 5/2004 | Redmond | B64C 39/026 244/10 |
| 2009/0076686 | A1* | 3/2009 | Schox | B64C 13/042 701/45 |
| 2012/0032032 | A1* | 2/2012 | De Roche | B64C 27/20 244/221 |
| 2012/0298790 | A1* | 11/2012 | Bitar | B64C 27/10 244/17.11 |
| 2013/0020429 | A1 | 1/2013 | Kroo | |
| 2013/0327880 | A1 | 12/2013 | Certain | |
| 2014/0014766 | A1* | 1/2014 | Redmon | B64C 39/026 244/13 |
| 2014/0374542 | A1* | 12/2014 | Li | B63H 11/04 244/4 A |
| 2015/0142213 | A1 | 5/2015 | Wang et al. | |
| 2015/0175031 | A1 | 6/2015 | Henderson et al. | |
| 2015/0331427 | A1* | 11/2015 | Chaudary | G05D 1/0858 244/17.13 |
| 2016/0023755 | A1 | 1/2016 | Elshafei et al. | |
| 2017/0174335 | A1* | 6/2017 | Malloy | B64C 27/08 |

OTHER PUBLICATIONS

TV Report; US Soldiers Could Soon Be Using Hoverbikes; ITV.com (http://www.itv.com/news/2015-06-22/us-soldiers-could-soon-be-using-hoverbikes/); Jun. 22, 2015.

Hoffmann, G.M. et al.; Quadrotor Helicopter Flight Dynamics and Control: Theory and Experiment; American Institute of Aernautics and Astronautics; Aug. 2007.

Hoopes, H.; E-Volo's 18-Rotor Electric Volocopter Makes Maiden Flight; Gizmag (http://www.gizmag.com/e-volo-electric-eighteen-rotor-volocopter-maiden-flight/29882/); Nov. 21, 2013.

Berard, Brian et al.; Quadrotor UAV Interface and Localization Design; Qualifying Project Submitted to Faculty of Worchester Polytechnic Institute; Oct. 17, 2010.

* cited by examiner

CONTROL AND STABILIZATION OF A FLIGHT VEHICLE FROM A DETECTED PERTURBATION BY TILT AND ROTATION

CROSS-REFERENCE TO RELATED PATENT APPLICATION(S)

This patent application claims priority to U.S. non-provisional patent application Ser. No. 15/091,566, filed on Apr. 5, 2016, which claims priority to U.S. provisional application 62/143,610, filed on Apr. 6, 2015, the contents of which are both incorporated in their entirety herein. In accordance with 37 C.F.R. § 1.76, a claim of priority to the '566 application is included in an Application Data Sheet filed concurrently herewith.

FIELD OF THE INVENTION

The present invention relates to control and stabilization of flight vehicles. Specifically, the present invention relates to detecting the orientation of a non-fixed portion of a flight vehicle relative to the other, fixed portion of the flight vehicle, and inducing the fixed portion to move in the direction of re-orientation with the non-fixed portion of the flying device following a detected perturbation in the non-fixed portion.

BACKGROUND OF THE INVENTION

There are many existing prior art methods for control and stabilization of aerial systems. Many modern flight vehicles, such as airplanes, employ various methods for controlling and stabilizing flight characteristics. Examples of these include flaps and rudders in wings, pilot-controlled rotors, gyroscopes, accelerometers, auto-stabilization algorithms, and automatic power-adjusted propulsion systems.

When effecting control of a flight vehicle, typically a user will perform an action such as rotating a steering column or pressing a control lever, causing the flight vehicle to turn in the direction specified by the user. This is performed by adjusting a mechanical aspect of the flight vehicle, such as for example a rudder. In some modern flight systems, movement of the aircraft in the manner specified by the user is augmented by computer algorithms that adjust trajectory in a certain manner. In such systems, the operator generally does not adjust their actual position or orientation, but adjusts a control apparatus or device. In multi-rotor vertical take-off and landing (VTOL) flight vehicles, such as quad-copters, controlling the flight vehicle may be performed by changing the rotor speed of one or some of the rotors based on operator input.

For flight vehicle stability, some systems rely on wings, while others depend on rotors and counter forces, such as the tail rotor of a helicopter. Additionally, many modern flight systems use computer stabilization algorithms in combination with wings, or gyroscopes/accelerometers. The latter is especially common in multi-rotor vertical take-off and landing (VTOL) style vehicles, to sense when the flight vehicle is no longer level, an adjust the speeds of certain rotors to level the flight system.

Additionally, some stabilization techniques use an outside frame of reference, such as a camera that tracks various parts of the flight vehicle or connected devices or systems, such as an object hanging from the flying device, or resting on top of the flying device. When these tracked points of the flight vehicle or connected devices or systems move in a certain way, as specified and recognized by the control algorithms, the control algorithms direct the flight vehicle to take some action (such as increase rotor speed to a particular rotor), in order to keep the flight vehicle stable.

BRIEF SUMMARY OF THE INVENTION

It is therefore one objective of the present invention to provide a system and method for control of a flight vehicle having a non-fixed component coupled to a fixed component and upon which a load is transportable. It is another objective of the present invention to provide a system and method for stabilization of such a flight vehicle.

It is another objective of the present invention to provide a system and method for control and stabilization of a manned flight vehicle that is maneuverable by movement of a pilot or rider stationed on the non-fixed component. It is yet another objective of the present invention to provide a system and method that allows the pilot or rider to maneuver the flight vehicle by tilting and/or rotating themselves on the non-fixed component.

The present invention comprises one or more systems and methods that include a flight vehicle control and stabilization process. A flight vehicle incorporating the present invention may be comprised of a non-fixed portion, such as a platform upon which a rider and/or payload is placed, that is coupled to a fixed portion or frame. The flight vehicle may be any kind of flying device, including (but in no way limited to) a multi-rotor copter such as a helicopter, an airplane, and a hover-bike or hovercraft. As noted above, the flight vehicle may be piloted or otherwise occupied by a rider. The flight vehicle may also be unmanned or remotely-piloted. The flight vehicle control and stabilization process may further be implemented in whole or in part in a hardware component, such as an embedded system or dongle. Such a hardware component is removable and/or programmable for various missions and for many types and configurations of flight vehicles.

The flight vehicle control and stabilization process includes detecting and measuring both an orientation of the non-fixed portion of the flying device relative to the fixed portion, and a degree of perturbation from an initial planar position of the non-fixed portion. The flight vehicle control and stabilization process also includes inducing motion in the fixed portion of the flight vehicle in response to the orientation of the non-fixed portion and the detected perturbation to move the fixed portion of the flight vehicle in a direction of re-orientation with the non-fixed portion where it may re-orient the fixed portion to match or substantially match that of the non-fixed portion of the flight vehicle.

Control and stabilization of a flight vehicle is further accomplished by detecting at least one of a tilt of the non-fixed portion in one or more directions transverse to a planar axis thereof, and rotation in one or more directions along the planar axis of the non-fixed portion. Tilting and/or rotation of the non-fixed portion by a rider or payload shift produces the perturbation from a prior planar position. The present invention measures the degree of perturbation and calculates a directional adjustment for the fixed portion of the flight vehicle following the tilt and/or rotation, and moves the fixed portion in the direction of re-orientation with the non-fixed portion in response to the directional adjustment, so that an orientation of the fixed portion matches or substantially matches an orientation indicated by the new planar position of the non-fixed portion relative to the fixed portion. The present invention may also calculate rates of change in the tilt and rotation of the non-fixed portion, and conduct the re-orientation of the fixed portion at a specific angular velocity reflective of those calculations.

The flight vehicle control and stabilization process of the present invention is also configured to determine, from the degree of perturbation, whether one or more of the tilt and the rotation exceeds preset threshold values. The fixed portion may be re-oriented to stabilize the flight vehicle to compensate for a degree of perturbation resulting where the one or more of the tilt and rotation exceed the preset threshold values. Regardless, the flight vehicle control and stabilization process of the present invention minimizes horizontal forces acting on certain regions of the flight vehicle, and focuses on the region where a load may be placed on or otherwise connected to the non-fixed portion, relative to the planar axis of the non-fixed portion.

After a perturbation is detected, the fixed portion of the flight vehicle responds to the calculated directional adjustment to move in the direction of re-orientation with the non-fixed portion, and may match or substantially match a planar position relative to the non-fixed portion. The fixed portion may therefore be induced to reach the same position as the non-fixed portion, or it may move in towards full reorientation but not fully reach the same position, thereby stopping short of a full re-orientation. The process may stop adjusting the fixed portion once it reaches a certain level of proximity to the desired position relative to the non-fixed portion, or if it reaches a certain position relative the ground. In this manner, the process may include components that anticipate subsequent perturbations from tilt and/or rotation of the non-fixed portion.

Inducing the re-orientation of the fixed portion of the flight vehicle may be accomplished by one or more computer algorithms that adjust engines or thrusters based on the measured degree of perturbation, change in position, of the non-fixed portion relative to the rest of the flight vehicle. It may also be accomplished by mechanical means, such as for example springs or other mechanical apparatuses, that induce the fixed portion of the flight vehicle to move in the direction of re-orientation relative to the non-fixed portion. These computer algorithms and mechanical means may operate in tandem, or separately.

Other objects, embodiments, features and advantages of the present invention will become apparent from the following description of the embodiments, taken together with the accompanying drawings, which illustrate, by way of example, the principles of the invention.

BRIEF DESCRIPTION OF THE SEVERAL VIEWS OF THE DRAWINGS

The accompanying drawings, which are incorporated in and constitute a part of this specification, illustrate several embodiments of the invention and together with the description, serve to explain the principles of the invention.

DETAILED DESCRIPTION OF THE INVENTION

In the following description of the present invention reference is made to the exemplary embodiments illustrating the principles of the present invention and how it is practiced. Other embodiments will be utilized to practice the present invention and structural and functional changes will be made thereto without departing from the scope of the present invention.

The present invention is a flight vehicle control and stabilization process 100, for operation of a flight vehicle 200 that is comprised of a non-fixed portion 210 coupled to a fixed portion or frame 220. The flight vehicle control and stabilization process 100 is performed within one or more systems and/or methods as described further herein.

Figure 1:
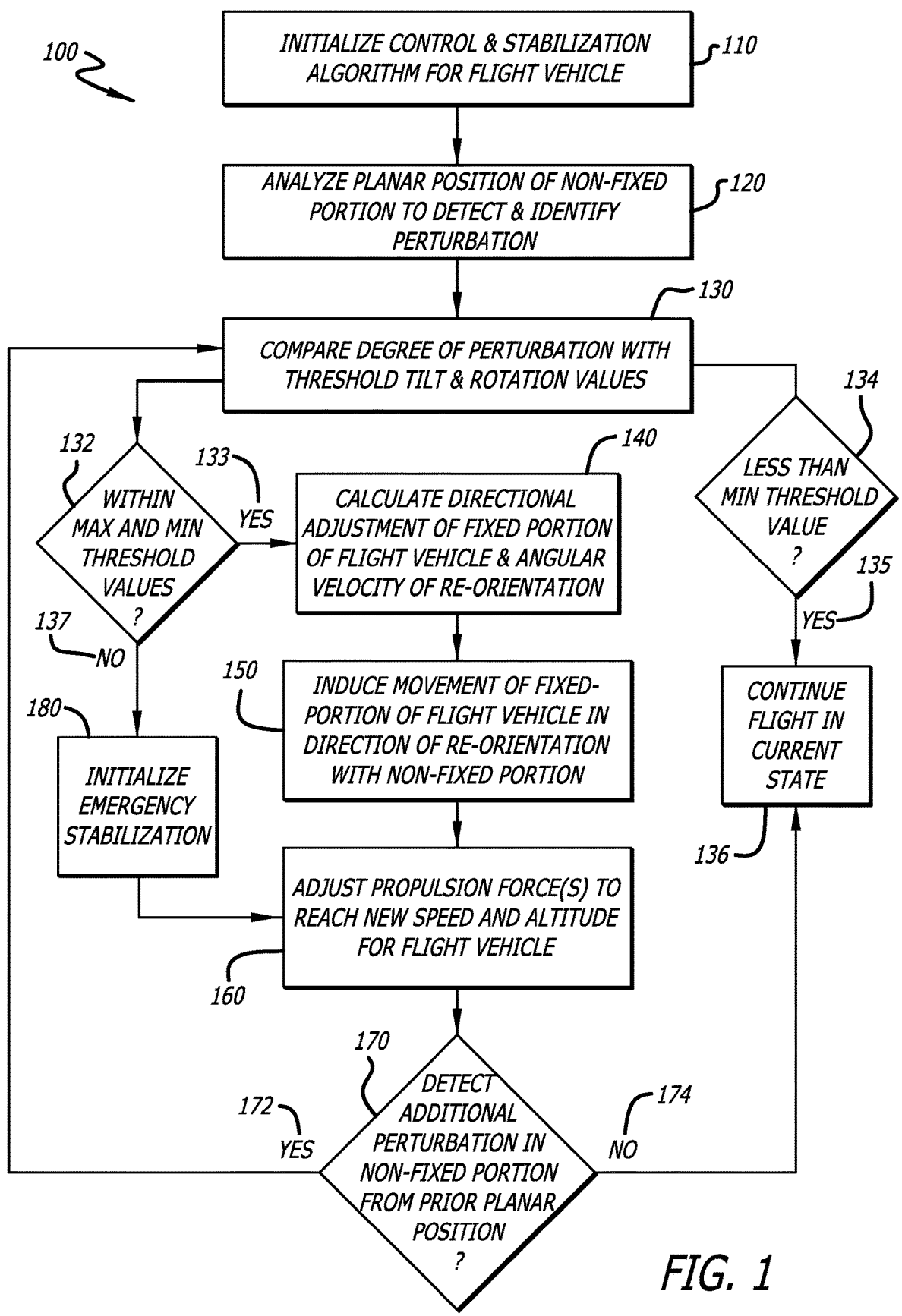
FIG. 1 is a flow chart of elements in a process for control and stabilization of a flight vehicle according to the present invention.
Figure 2:
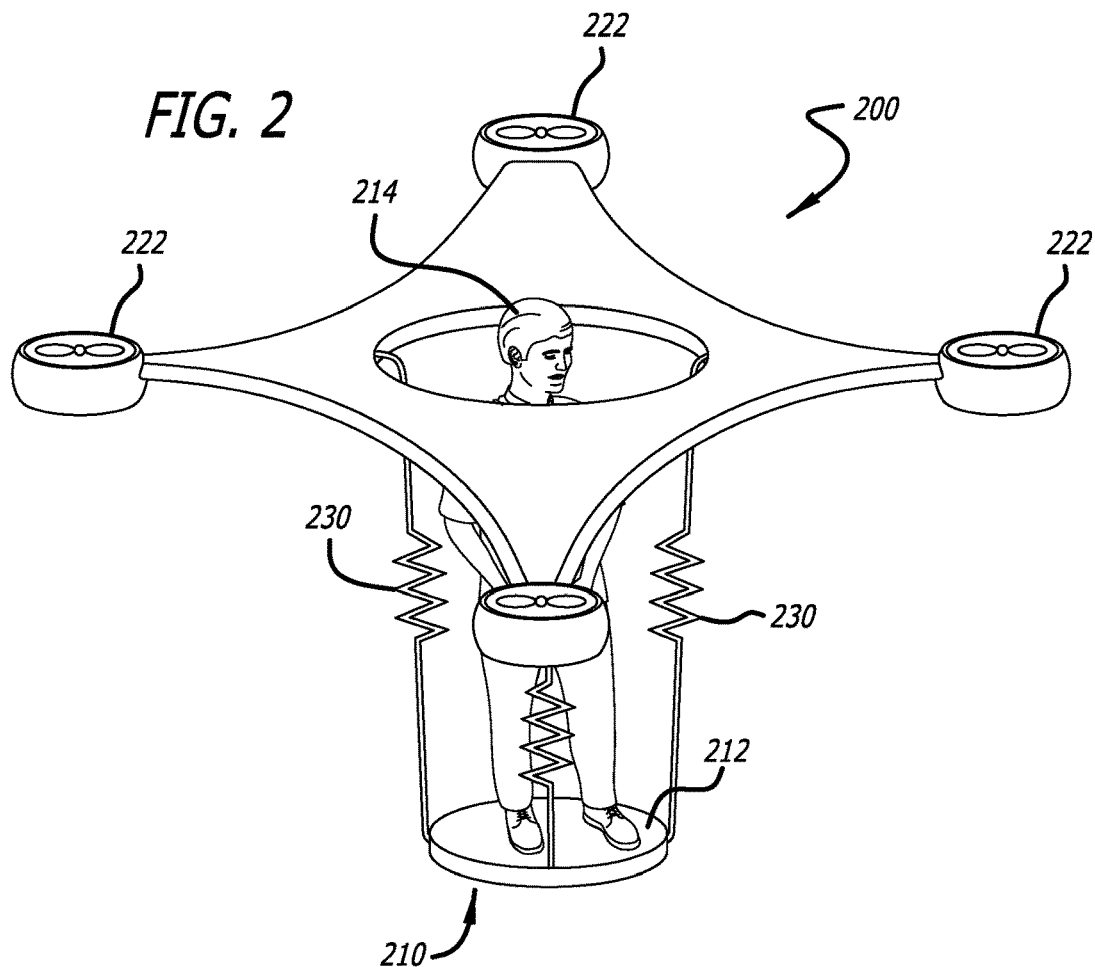
FIG. 2 is a perspective view of an exemplary flight vehicle according to one aspect of the present invention.

FIG. 1 is a flow chart illustrating various functions of the present invention, according to one embodiment thereof. In this embodiment, a control and stabilization algorithm for flight vehicle operation is initialized at step 110. This may occur for example where a flight vehicle is first powered on. The process 100 begins by analyzing a planar position of a non-fixed portion 210 of a flight vehicle 200 at step 120, by detecting whether a perturbation from an initial planar position of the non-fixed portion has occurred. The process 100 identifies and measures a degree of such perturbation relative to the fixed frame 220, and then compares, at step 130, the degree of perturbation with maximum and minimum threshold values for either or both of tilt or rotation. Where a degree of perturbation does not exceed a minimum threshold value 134, the process 100 may return a no or null value that indicates a "yes" at step 135 to proceed under current/normal conditions. The result, at step 136, is the flight vehicle 200 is allowed to continue operation in its current state.

The comparison at step 130 also checks for whether the degree of perturbation exceeds a maximum threshold value at step 132. Where a degree of perturbation is within the maximum and minimum threshold values, the process 100 may return a yes value 133, and continues by calculating a directional adjustment of the fixed frame 220 in response to one or both of the tilt or rotation at step 140. This calculation of the directional adjustment at step 140 may further include determining a new planar position of the non-fixed portion relative to the fixed portion, and calculating an angular velocity for a re-orientation of the fixed portion in response to the directional adjustment from a rate of change in the tilt in one or more directions transverse to the planar axis of the non-fixed portion, and a rate of change in the rotation in one or more directions along the planar axis. The calculation of the directional adjustment may also include a comparison of the planar position, following perturbation from tilt and/or rotation, with a ground, level, or horizon, or a substantially horizontal planar position of the non-fixed portion 210.

A degree of perturbation may be comprised of one or multiple components, such that the degree may have both a direction and a magnitude, and may include a specific angular differential. The flight vehicle control and stabilization process 100 may therefore identify a degree of perturbation by measuring one or both of a directional change resulting from the perturbation and a magnitude of such a directional change. Many different parameters may represent such a directional change and magnitude thereof, such as for example an angular differential from a planar position.

For example, the flight vehicle control and stabilization process 100 may sense and measure a degree of tilt (such as in 12° or 6° from a prior planar position by way of additional example). When the tilt angle between the non-fixed portion 210 and the fixed portion 220 is determined to be non-zero, the flight vehicle control and stabilization process 100 calculates the directional adjustment and communicates appropriate signals to the engines powering the flight vehicle 200 to fire in such a way to move the fixed portion in the direction of re-orientation with the non-fixed portion, and may re-orient the fixed portion 220 to return that angle back to zero.

In another embodiment, one or more sensors 240 measure a linear distance between those sensors and a paired "sister" sensor on the fixed portion 220. When that distance increases, the flight vehicle control and stabilization process 100 calculates the directional adjustment and communicates appropriate signals to the engines powering the flight vehicle 200 to adjust in a manner that re-orients the fixed portion 220 to return the linear distance back to a value prior to the perturbation.

At step 150, the flight vehicle control and stabilization process 100 induces the movement in the direction of re-orientation of the fixed frame 220, and may match or substantially match the orientation of the new planar position of the non-fixed portion 210 following the perturbation from tilt and/or rotation. It is to be understand that the calculation of the directional adjustment at step 140 may indicate that realization of the inducing a re-orientation would result in a position of the fixed portion that is almost the same as that of the non-fixed portion, rather than exactly the same. In other words, the calculation of the directional adjustment may take into account one or more forces acting on the non-fixed portion from a re-orientation of the fixed portion, and may anticipate an intended direction from the perturbation of the planar position of the non-fixed portion from tilt and/or rotation thereof and induce a movement of the fixed portion in the direction of re-orientation with the non-fixed portion.

Where the comparison step determines that the degree of perturbation is not within the maximum and threshold values (in conjunction with step 134), the process 100 concludes that the degree of perturbation exceeds a maximum threshold value and returns a no or null state 137. This initializes an emergency stabilization at step 180, and the process calculates an appropriate responsive adjustment to the degree of perturbation.

At step 160, the flight vehicle control and stabilization process 100 continues by adjusting one or more propulsion forces acting on the flight vehicle 200 to reach a new altitude and/or a new speed in response to the perturbation of the planar position of the non-fixed portion from tilt and/or rotation thereof. Step 160 is performed to ensure that one or both of an altitude or speed is maintained for the flight vehicle 200 following a re-orientation of the fixed frame 220. At step 160, an adjustment of the propulsion forces may occur because the flight vehicle 200 is induced to move horizontally in the direction of the tilt, when the non-fixed portion is induced to tilt. The horizontal speed of the flight vehicle 200 would therefore increase, and the more tilt applied to the non-fixed portion, the faster, horizontally, the flight vehicle 200 may accelerate.

In an initial position, and before the flight vehicle 200 is induced to tilt, thrusters are normally facing straight down, so that all of the force from them is keeping the flight vehicle at one position, However, when the non-fixed portion 210 tilts, and the fixed frame 220 is induced to tilt itself to re-adjust, the new direction of the thrusters is no longer vertically down, but now at an angle. If the thrust remained the same, the flight vehicle 200 would lose altitude, as not all of the force from the thrusters would be in the vertical, Y-axis direction. However, because the thrusters are now tilted, a portion of that thrust would be in the horizontal, X-axis direction. The thrust of the engines acting as propulsion forces must therefore increase when the fixed portion 220 is titled to re-orient with the non-fixed portion 210, in order for the flight vehicle 200 to maintain a constant altitude. Additionally, the thrust increases as a function of the angle of tilt of the overall, re-orientated flight vehicle 200.

It is to be noted that the altitude and speed of the flight vehicle 200 may also be controlled from either some perturbation of the planar position of the non-fixed portion 210, or by another means of indicating that a change in altitude or speed is desired. Many examples of this are contemplated in the present invention. In one such example, the flight vehicle control and stabilization process 100 may detect a unique tap, or set of taps, for example by one or both feet of a pilot or rider on the non-fixed portion 210, and may further identify a unique or specific timing between taps (or a duration of pressure or non-pressure of taps during a tap or tap sequence) to ascertain intended instructions to the flight vehicle from the pilot or rider. These instructions may be for a variety of flight characteristics, such as altitude adjustment, pre-programmed navigational sequences, or a 'return to launch site' command". In another example, such instructions may be provided by a rapid, or quick, jolt on a part (back, front, etc.) of the non-fixed portion, followed by a subsequent rapid or quick jolt on another part of the non-fixed portion. In such an example, the amount of the increase in altitude is a function of the timing and spacing of the locations of these rapid or quick jolts. Regardless, it is to be understood that many ways of indicating a desired change in altitude or speed are possible.

The calculation of the directional adjustment at step 140 may further comprise, as noted above, a stabilization step. The threshold tilt and rotation values compared at step 130 represent minimum threshold values, below which no directional adjustment is calculated. Above those threshold values, the flight vehicle control and stabilization process 100 performs the various mathematical manipulations and functions described further herein to determine the amount of re-orientation needed in the fixed portion 220 of the flight vehicle 200.

The comparison step 130 may also include, however, a comparison with maximum tilt and rotation threshold values, above which a stabilization portion of the process 100 is initiated to correct an error state. Such an error state may occur, for example, where a payload carried by non-fixed portion 210 overturns, causing a large change in the center of the mass of the non-fixed portion, and/or a rapid movement of the non-fixed portion 210 beyond pre-specified levels. It is therefore to be understood that different maximum and minimum values for these threshold values may be set, for different missions undertaken by the flight vehicle 200, and depending on the type of payload to be transported.

Step 140 may therefore include such a stabilization portion, by calculating a directional adjustment to compensate for a degree of perturbation resulting from one or more of tilt and rotation that exceeds maximum preset threshold values. Additionally, step 150 may include inducing a re-orientation of the fixed portion to stabilize the flight vehicle 100.

The flight vehicle control and stabilization process 100 also includes a feedback loop that continually analyzes whether tilt or rotation is actuated on the non-fixed portion 210 to detect additional perturbations in a planar position. At step 170 this feedback loop determines whether an additional perturbation has occurred, and if yes at step 172, returns to step 130 for a comparison of the degree of perturbation against threshold tilt and rotation values. If no, at step 174, the process 100 takes no action and allows the flight vehicle 200 to continue with operation in a current state at step 136.

As suggested above, the present invention contemplates that a re-orientation of the fixed portion 220 may match, or substantially match, an orientation of the non-fixed portion 210. Therefore, the present invention may not induce the fixed portion 220 to re-orient itself to the precise, post-perturbation angular position of the non-fixed portion, and therefore may not effect a "full" re-orientation. In such a situation, the present invention may anticipate an intended subsequent direction from an additional perturbation of the planar position of the non-fixed portion 210. The process 100 may therefore stop or slow the adjustment of the fixed portion 220 once it reaches a certain level of proximity to the desired position relative to the non-fixed portion 210, or if it reaches a certain position relative the ground. The process 100 may include components that anticipate subsequent perturbations from tilt and/or rotation of the non-fixed portion 210. These components may be responsive to various parameters, such as operating conditions, mission-specific characteristics, payload rules, and other factors.

The flight vehicle control and stabilization process 100 may be performed within a specific computing environment, and the systems and methods embodying the present invention includes a plurality of steps that are carried out by plurality of data processing modules. The computing environment includes one or more processors and a plurality of software and hardware components for further performing the flight vehicle control and stabilization process 100. The one or more processors and plurality of software and hardware components are configured to execute program instructions or routines to perform the functions described herein, and embodied by the plurality of data processing modules.

FIGS. 2-6 show various embodiments of flight vehicles 200 that incorporate the flight vehicle control and stabilization process 100. Flight vehicles 200, for example as in the perspective view of FIG. 2 and the cross-sectional views of FIG. 3A-3C, include a non-fixed portion 210 as noted above, coupled to a fixed portion or frame 220. The fixed portion or frame 220 may include one or more rotors 222, where the flight vehicle 200 is a multi-rotor copter, such as for example a quadcopter. Regardless of the configuration, the non-fixed portion 210 is at least partially mobile, and capable of motion relative to the fixed portion 220.

The non-fixed portion 210 may include a platform 212 that is coupled to the fixed portion 220 with one or more tensile coupling mechanisms 230. The platform 212 is capable of supporting a pilot or rider 214, standing or sitting on thereon, or an inanimate payload 216. In the flight vehicles 200 shown in FIG. 2 and FIG. 3A-3C, the platform 212 hangs below or slightly below the fixed portion 220, whereas in other embodiments (such as for example in FIG. 4), the platform 212 comprising at least part of the non-fixed portion may be positioned level with, or on top of, the fixed frame 220. Regardless, it is to be understood that the tensile coupling mechanisms 230 enable the non-fixed portion 210 to move, in either or both of a rotatable fashion or a tilting fashion, relative to the fixed portion 220, so as to deviate from a planar position of the non-fixed portion 210.

One or both of the non-fixed portion 210 and the fixed portion 220 of the flight vehicle 200 may include sensors 230. These sensor 230 detect and identify tilting and/or rotation of the non-fixed portion 210 relative to the rest of the flight vehicle 200. Sensors 230 may also be part of the tensile coupling mechanisms 240, or responsive to movement therein such as vibrations, for the purpose of detecting and identifying a perturbation of the planar position of the non-fixed portion 210. Data from the sensors 230 may be provided to one or more processing components that measure the degree of perturbation and determine a directional adjustment therefrom.

Figure 4:
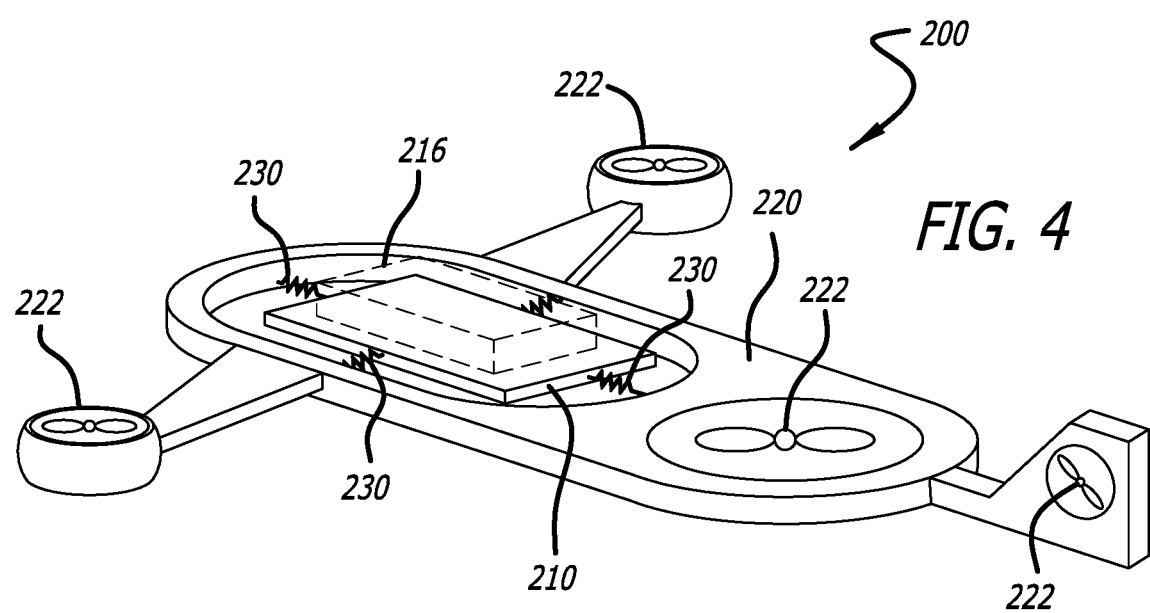
FIG. 4 is a perspective view of another exemplary flight vehicle in which the present invention is embodied.

FIG. 4 is a perspective view of one embodiment of a flight vehicle 200 in which the present invention is incorporated. In this embodiment, the flight vehicle 200 is a multi-rotor hovercraft, and the non-fixed portion 210 is on top of, or flush with, a horizontal plane of the fixed portion 220. The non-fixed portion 210 includes a platform 212 upon which an inanimate payload 216 is placed. Such a flight vehicle 200 may be used for unmanned package deliveries.

Figure 5:
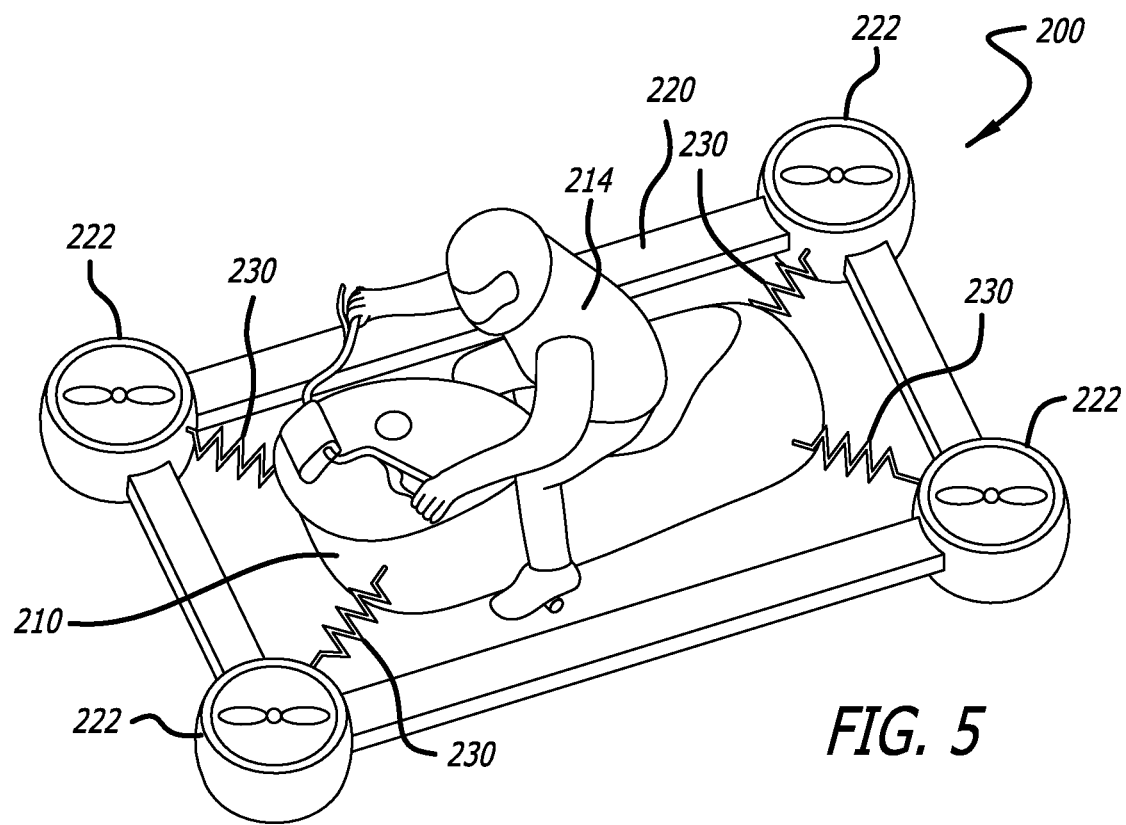
FIG. 5 is a perspective view of yet another exemplary flight vehicle in which the present invention is embodied.
Figure 6:
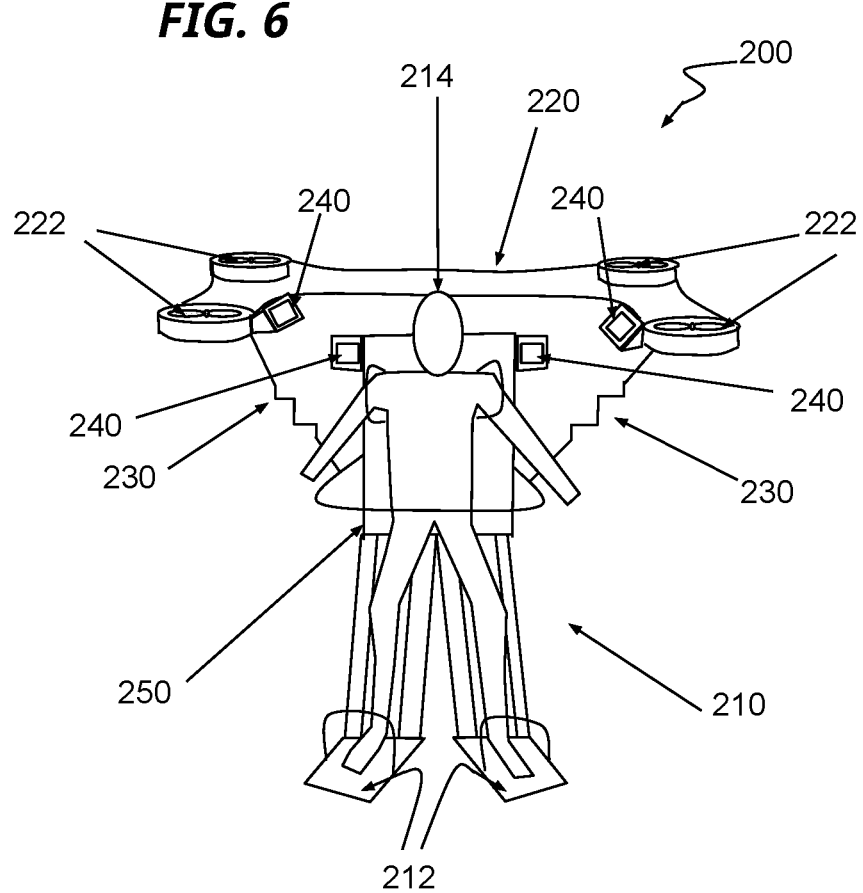
FIG. 6 is a perspective view of still another exemplary flight vehicle in which the present invention is embodied.

FIG. 5 is a perspective view of a further embodiment of a flight vehicle 200 in which the present invention is incorporated. In this embodiment, the flight vehicle 200 is a hovercraft in the form of a hover-bike, where the rider 214 is seated on a motorcycle or bicycle-style seat. This seat forms the non-fixed portion 210, which is coupled to the fixed frame 220 by the tensile coupling mechanisms 230. Movement of the rider 214 on the seated non-fixed portion 210, either by tilting or turning/rotating, causes the fixed portion 220 to re-orient itself accordingly. FIG. 6 is a view of a further embodiment of a flight vehicle 200 in which the present invention is incorporated. In this embodiment, the flight vehicle 200 is formed as a body suit worn by the pilot or rider 214. The body suit may incorporate both a non-fixed portions 210 and a fixed portion 220, and one or sensors 240 may therefore be worn on the body suit itself.

Regardless of the type or configuration of tensile coupling mechanism 230 or sensor 240, and regardless of the flight vehicle 200 configuration, the present invention is configured to calculate the directional adjustment and induce a re-orientation in the fixed portion 220 where a perturbation from a planar position occurs in the non-fixed portion 210. Such a perturbation may be effected by a rider or pilot 214 for the purpose of controlling the flight vehicle 200, or may result from a shift in a payload 216, or both.

The pilot 214 is able to induce a re-orientation of the fixed portion 220 by tilting or rotating the non-fixed portion 210, from moving his or her body in the desired direction. When positioned on the platform 212 (standing, sitting, or reclined/prone in some manner), and the pilot 214 moves the body forward, backward, or angularly in one or more directions transverse to a planar axis of the non-fixed portion 210, this action alters the planar position of the platform 212 by tilting. Similarly, if the pilot moves the body to the left or to the right along the planar axis, this action also alters the planar position of the platform 212 by rotation. Together or separate, these actions cause a perturbation in the planar position of the non-fixed portion 210. The flight vehicle control and stabilization process 100 detects and measures this perturbation, and calculates the directional adjustment according to the degree of perturbation.

The flight vehicle control and stabilization process 100 is implemented in a flight vehicle 200 as in, for example, the embodiments showing in FIGS. 2, 3A-3C, 4, 5 and 6. The present invention is, in one aspect thereof, a method of detecting or sensing, the orientation of the non-fixed portion 210 of the flight vehicle 200 relative to the fixed frame 220. When the orientation of the non-fixed portion 210 of the flight vehicle 200 changes, relative to the other, fixed portion 220, the orientation of the fixed frame 220 is induced to move in the direction of re-orientation with the non-fixed portion, and may match the orientation of the non-fixed portion 210 by moving in a certain manner and according to the mathematical calculations and functions described herein.

It is to be understood that both tilt and rotation of the non-fixed portion may effect directional changes in the non-fixed portion 210. Rotational changes of the non-fixed portion 210 relative to the fixed frame 220, about the vertical axis of the non-fixed portion 210, which is the axis perpendicular to the plane of the non-fixed portion 210, may therefore also be incorporated. In this case, the fixed frame 220 would then be induced to rotate, to move rotationally in the direction of re-orientation with the non-fixed portion, and may match the rotation of the non-fixed portion 210, in a similar manner to the way it adjusts itself to the orientation of the non-fixed portion 210 following tilting thereof.

In determining a directional adjustment in the flight vehicle control and stabilization process 100, threshold values that represent the maximum levels that the non-fixed portion 210 is permitted to tilt and rotate may be utilized. When a maximum threshold tilt or rotation is exceeded, a stabilization protocol may be initiated, as this is indicative of an emergency condition. Similarly, threshold values that represent a minimum that the non-fixed portion 210 is permitted to tilt and rotate without initiating a directional adjustment calculation may also be utilized. Tilting and rotating below this minimum threshold value may be deemed as normal operational fluctuations in planar position, and the flight vehicle 200 is permitted to continue in its current flight state without adjustment. Regardless, it is to be understood that these maximum and minimum threshold values may be preset conditions that depend on the type of craft, configuration of the craft, flight conditions, type of mission, type of payload, and whether the flight vehicle 200 is manned or unmanned. The maximum and minimum threshold values may also be automatically or manually set, and may be changed, for example as conditions change during a flight or mission.

The flight vehicle control and stabilization process 100 may operate in a continuous manner as a feedback loop, so as to check for a perturbation at for example, a rate of many times per second. If it is found that the orientation of the non-fixed portion 210 relative to the fixed portion 220 has changed to a degree that is within these threshold values, the present invention directs one or more signals to the fixed portion to move in the direction of re-orientation relative to the non-fixed portion 210. A re-orientation from a calculated directional adjustment may be accomplished by, by way of example, changing the amount of power to various rotors on the flight vehicle 200, or changing the angle of a vertical jet on the flight vehicle, or it may be accomplished by another means. It is to be noted that different types of flight vehicles 200 and configurations thereof may include different systems and methods of powering them during flight, and therefore the means for accomplishing the re-orientation may be dependent on the flight vehicle 200 itself. Regardless, the feedback loop of detecting and the inducement of movement continues as long as the flight vehicle 200 is powered on or otherwise in a flight mode.

One way in which the present invention provides control and stability to a flight vehicle 200 is by minimizing the effective horizontal force, and its derivatives, relative to the plane of the non-fixed portion 210 (henceforth referred to as the horizontal force). Specifically, if the non-fixed portion 210 that is initially aligned with the rest of the flight vehicle 200 tilts by changing its transverse orientation, but the fixed portion 220 is still being propelled in the same direction it was before tilting movement, there will be horizontal forces relative to the plane of the non-fixed portion 210 on any load resting on or otherwise connected thereto.

This causes instability, as the sum of the forces acting on the flight vehicle 200 by the resulting horizontal force and the propulsion force of the fixed portion 220 results in a torque that will cause the flight vehicle 200 to tip to one side. If no adjustments are made, this tipping will continue, and the flight vehicle 200 will overturn.

However, if the fixed portion 220 is induced to change its orientation and move in the direction of re-orientation with the non-fixed portion 210 to the extent that it may match the orientation of the non-fixed portion 210, then the sum of forces acting on the flight vehicle 200 will be such that there is little or no torque, and the flight vehicle 200 will become stable as both the non-fixed portion 210 and the fixed portion 220 will stay at the angle θ to which the non-fixed portion 210 was tilted.

Figure 3A:
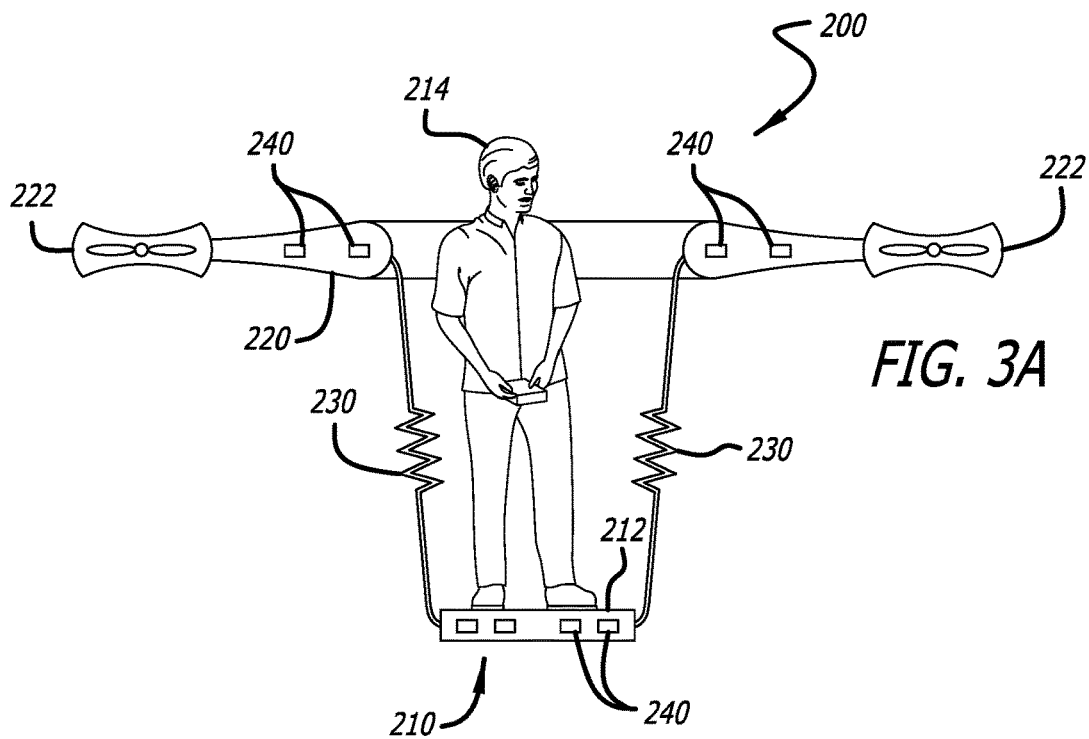
FIG. 3A is a cross-sectional view of the exemplary flight vehicle of FIG. 2.
Figure 3B:
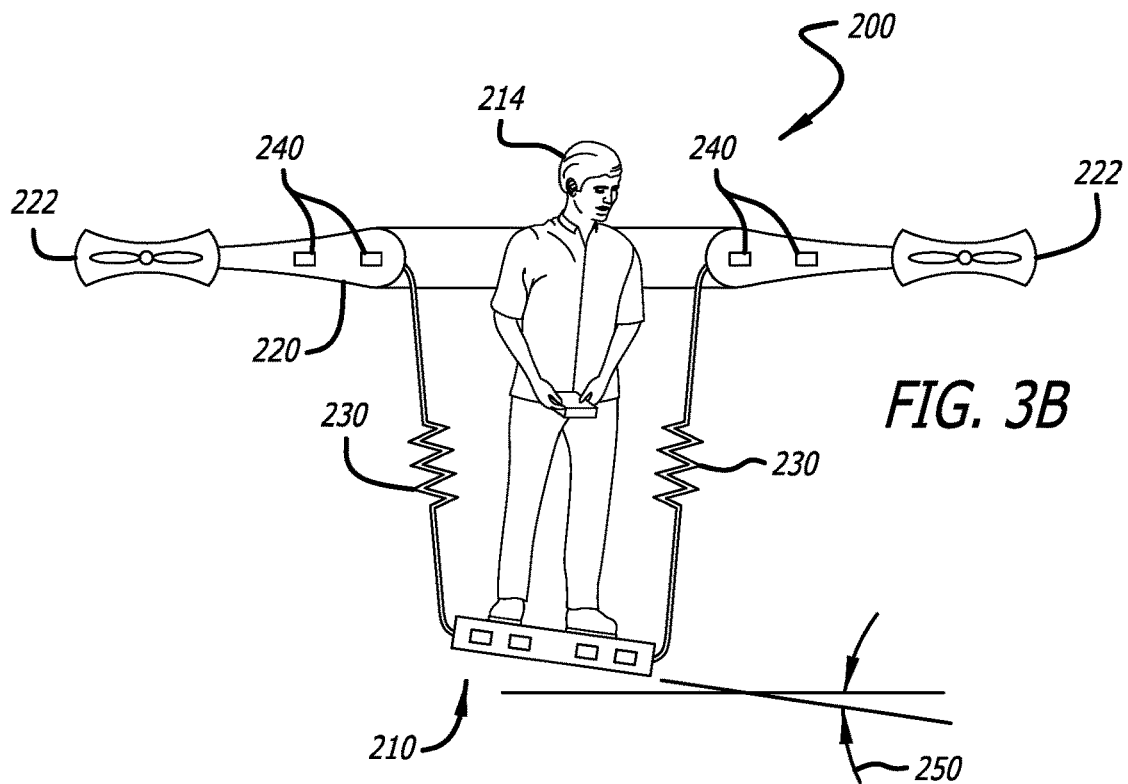
FIG. 3B is another cross-sectional view of the exemplary flight vehicle of FIG. 2 showing tilting of a non-fixed portion of the flight vehicle.
Figure 3C:
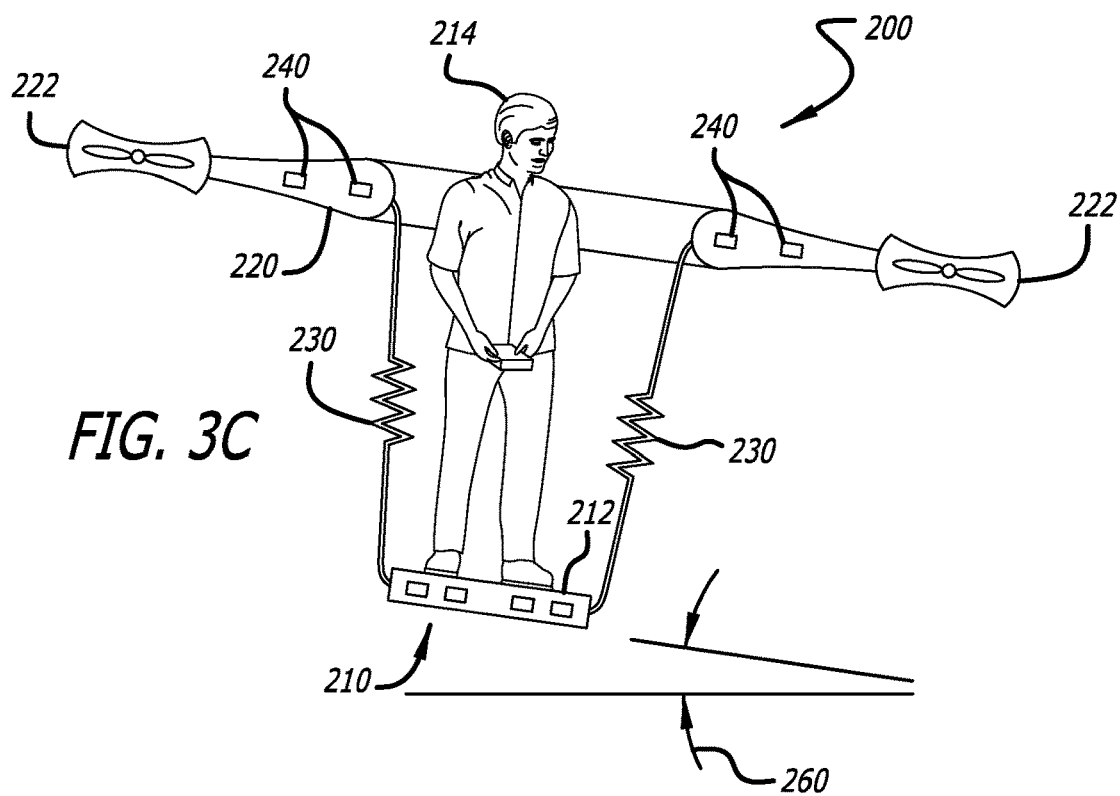
FIG. 3C is another cross-sectional view of the exemplary flight vehicle of FIG. 2 showing tilting of a fixed portion in response to a tilt in the non-fixed portion of the flight vehicle.

This is therefore one way that the present invention effects control of a flight vehicle 200—when the process 100 detects that the non-fixed portion 210 has tilted by an angle θ 250 as in for example FIG. 3B, the fixed portion 220 moves in the direction of re-orientation with the non-fixed portion 210, to the extent that it may match the orientation of the non-fixed portion 210, to yield an overall force and manipulate the flight vehicle 200 in that direction. In this manner, the flight vehicle 200 is stabilized following the perturbation, and directional control is achieved by orienting the fixed portion 220 in response to the tilt angle θ 250 of the non-fixed portion 210, such that the resulting tilt angle 260 of the fixed portion 220 may be similar in degree and direction.

In this example, as some of the vertical force that was maintaining the altitude of the flight vehicle 200 has now been re-directed to propel it laterally, the overall sum of the propulsion force must be increased in order to maintain the same elevation as before the tilt. If the non-fixed portion 210 is then tilted back in the opposing direction at an angle θ', the fixed portion 220 will again reorient itself. When it has reached a satisfactory re-orientation relative to the non-fixed portion 210, another force in that opposing direction will be obtained. This allows the pilot 214 to control the direction of the flight vehicle 200 by intentionally tilting and/or rotating the non-fixed portion 210 in the direction that the pilot 214 wishes to travel.

It is therefore to be understood that the tensile coupling mechanisms 230 must allow for adequate movement of the non-fixed portion 210 relative to the other portion of the flight vehicle 200. In one aspect of a flight vehicle 200 incorporating the present invention, the non-fixed portion 210 must be able to transversely tilt, in any or all of pitch, roll, and yaw dimensions, so that if a load is on the non-fixed portion 210, and that load tilts or otherwise changes its center of mass (for example by falling or shifting), the non-fixed portion 210 must have sufficient mobility enough to tilt or rotate accordingly. As suggested above, tilting threshold value may be specified, so that if the non-fixed portion 210 tilts too far, an alternative or additional stabilization method may be enacted to better stabilize the flight vehicle 200. The non-fixed portion 210 may also be able to rotate about the planar axis of the non-fixed portion 210 of the flying device 200.

The flight vehicle control and stabilization process 100 also determines the manner, which may be described as the angular velocity, in which the fixed portion 220 moves while moving in the direction of re-orientation with the non-fixed portion 210. This angular velocity is a function of the rate of change detected in one or both of the tilt and rotation movements imparted to the non-fixed portion 210. The fixed portion 220 may therefore move with varying levels of angular velocity, depending on one or both of the relative angle and the rate of change of the relative angle between the non-fixed portion 210 and the fixed portion 220. It may move quickly when there is a large differential, to achieve stability, and it may move slowly when there is a small differential to allow for a smooth ride. Additionally, the angular velocity of the fixed portion 220 may change during the process of re-orientation.

The angular velocity of the re-orientation of the fixed portion 220 of the flight vehicle 200 may be described as a non-linear or linear function, or a set of non-linear and linear functions, of the degree, rate of change, and change of rate of change of the perturbation, as well as other parameters related to potentially the load, weather, type of flying, etc., where the manner in which the fixed portion moves in the direction of re-orientation with the non-fixed portion is designed to optimize stability and control, which may be different in various embodiments of the invention. It may be described as:

$$\omega = f(\varphi, \varphi', \varphi'', \varphi''', \varphi'''', K, g(\varphi, \varphi', \varphi'', \varphi''', \varphi'''', L))$$

Where $\varphi$ represents the degree of perturbation, $\varphi'$, $\varphi''$, $\varphi'''$, $\varphi''''$ are the first, second, third and fourth derivatives of p, K and L are sets of constants with the appropriate dimensions, and f and g are functions or sets of functions, and may be differential equations and may involve integrands, that may include exponential, trigonometric and non-real terms, in addition to standard mathematical operations of addition, subtraction, division, multiplication.

In the case where there are both tilting and rotational differentials at the same time, the directional adjustment of the fixed portion 220 relative to the non-fixed portion 210 may treat each of the tilt and rotational re-orientations as linearly independent movements, or may link them so as to process the movements together to calculate a multi-variate angular velocity. Regardless, it is to be understood that the present invention may analyze a response angular velocity from tilt and rotational perturbations in any manner designed to minimize the change of the center of mass as re-orientation of the flight vehicle 200 occurs.

Tensile coupling mechanisms 230 comprise a means for coupling the non-fixed portion 210 to the fixed portion 220, and may include any device or mechanism that attaches the non-fixed portion 210 to the rest of the flight vehicle 200, while still remaining flexible or elastic so as to enable the non-fixed portion 210 to tilt and/or rotate in any direction relative to the rest of the flight vehicle 200. Tensile coupling mechanisms 230 may have one or more mechanical components that act on the rest of the flight vehicle 200 to "pull" it in the direction of re-orientation with the non-fixed portion 210 of the flying device 200, relative to the tilt or rotation.

Examples of tensile coupling mechanisms 230 include, but are not limited to, metal springs with rubber damping pads, hydraulic coupling mechanisms that allow motion while providing a dampening property, magnets that hold the non-fixed portion of the flight device 'in place' with the rest of the flight device, but such that the non-fixed portion 210 does not actually touch the rest of the flight vehicle 200, and other mechanisms that hold the non-fixed portion 210 'in place' while not actually touching the rest of the flying vehicle 200, such as hinges. Tensile coupling mechanisms 230 may be made only of rubber, or may include chains or cables such that the platform 212 of the non-fixed portion 210 hangs from them.

It is to be understood that the means for coupling the non-fixed portion 210 with the rest of the flight vehicle 200 is not to be limited to any one mechanism in a system or method described herein. It is to be further understood, however, that the non-fixed portion 210 must be coupled to the rest of the flight vehicle 200 in some manner, such as by physically touching or otherwise, while still providing mobility so that the non-fixed portion 210 may tilt and/or rotate, or be tilted or rotated, relative to the fixed portion 220.

As noted above, one or more springs may comprise the tensile coupling mechanisms 230. Where one or more springs couple the non-fixed portion 210 with the rest of the flight vehicle, the springs may measure or register the degree to which the non-fixed portion 210 has tilted, by the stretch of the spring. The stretched spring exerts a greater force on attachments on the end opposite the tilt or rotation. Given these forces, the spring(s) would exert a force on, or pull, the rest of the flight vehicle 200 in the direction of re-orientation with the non-fixed portion 210. Thus, the rest of the flight vehicle 200 moves in the direction of re-orientation with the non-fixed portion 210.

In one embodiment of the flight vehicle 200 within which the flight vehicle control and stabilization process 100 of the present invention is incorporated, a perturbation of the non-fixed portion 210 from a planar position thereof is detected, or measured, by one or more sensors 240 that are positioned on one or both of the non-fixed portion 210 or the fixed frame 220. Sensors 240 comprise a means for detecting such a perturbation and/or measuring a degree thereof, and may include any device that recognizes the orientation or location, or change of orientation or location, of the non-fixed portion 210 relative to the rest of the flight vehicle 200.

Examples of sensors 240 include, but are not limited to, electromagnetic wave-based measurement devices (within the visible spectrum or otherwise), sonar-based devices, and magnets. Sensors 240 may also include mechanical components, such as for example where a compression of a spring is measured, or where certain vibrations in the tensile coupling mechanisms 230 are detected. Sensors 240 may be placed in multiple locations on either of the non-fixed portion 210 or the fixed portion 220 of the flight vehicle 200. The present invention contemplates that at least one sensor 240 is utilized to perform the detecting and/or measuring aspects of the flight vehicle control and stabilization process 100.

Sensors 240 may further measure the relative angle of the non-fixed portion 210 and the fixed portion 220 of the flight vehicle 200 to an outside frame, to a gravitational direction, or to ground. In one embodiment, these sensors 240 may comprise gyroscopes and/or accelerometers, in one or both of the non-fixed portion 210 and the fixed portion 220 of the flight vehicle 200, for measuring their respective orientations and enable calculations of the difference in orientation.

Sensors 240 may also include relative distance measuring devices that measure the distance and difference in distance between various parts of the non-fixed portion 210 and the fixed portion 220, enabling a determination of the relative orientation between the non-fixed portion 210 and the fixed portion 220 of the flight vehicle 200.

It is to be understood that the means for detecting a perturbation, and/or measuring a degree thereof, is not to be limited to any one type of sensing component in a system or method described herein. It is to be further understood, however, that the sensing component must be configured to determine the relative location or orientation, or change in location or orientation, in planar position resulting from a tilt and/or rotation of the non-fixed portion 210 relative to the fixed frame 220 of the flight vehicle 200. Any known device that accomplishes this objective is contemplated to be within the scope of the present invention.

As noted above, the flight vehicle 200 may be configured to carry a payload 216 on the platform 212 of the non-fixed portion 210. A payload 216 may include inanimate objects such as a package or other item for delivery, for example where the flight vehicle 200 is an unmanned aerial vehicle such as drone configured to delivery to a customer. A payload 216 may also include objects such as a camera or other imaging system, such as where the flight vehicle 200 is configured for photography. Other objects that may comprise a payload include weapons, weapons systems, satellites, other craft, or any other items that can be transported or used in flight.

A flight vehicle 200 incorporating the present invention may be any kind of manned, unmanned, or remotely-piloted aerial system. As noted above, flight vehicles 200 may include, but are not limited to, multi-rotor copters such as helicopters, quadcopters (as shown for example in FIG. 2, and 3A-C), and other multi-rotor aerial systems such as that shown in FIG. 4, as well as airplanes, hover-bikes (such as that shown in FIG. 5), an apparatus worn as a body suit (such as that shown in FIG. 6) or other hovercraft. Many configurations of such flight vehicles 200 are contemplated, and it is to be understood that the present invention shall in no way be limited by any specific configuration or type of flight vehicle 200 described herein.

This present invention also contemplates, as noted throughout, one or more algorithms that act to stabilize a flight vehicle 200 based on the tilting and/or rotating of the non-fixed portion 210, regardless of whether the tilt or rotation was intentional or unintentional. Stabilization of the flight vehicle 200 looks to minimize (i.e. approaching zero) horizontal force on any object positioned on or otherwise connected with the non-fixed portion 210. For example, a vertical height of the non-fixed portion 210, or other aspects of the application of the present method, may be optimized to result in a planned center of mass of the total flying system (flight vehicle 200 and user or load), depending on the configuration or type of the flight vehicle 200, its mission, and the specific pilot 214 or load 216 placed on the non-fixed portion 210.

The present invention may implement additional stabilization processes where necessary. One such process is commonly referred to as a proportional-integral-derivative control method, and this may be utilized by applying certain weights as described below, in the manner of a potentially nonlinear weighted sum to allow for overall control, the type (responsiveness/agility) of control desired in a given situation, and for stability.

Stability may therefore be analyzed according to the following equation:

$$F_{total} = j * F_{present\ invention} + k * F_{additional.method}$$

where k and j are weighting factors that may relate to the degree of perturbation of the non-fixed portion in a non-linear or linear manner, and may be determined using the change, rate of change and rate of rate of change of the degree of perturbation.

After a directional adjustment is calculated from one or both of tilting or rotating the non-fixed portion 210, the total sum of the propulsion forces acting on the flight vehicle 200 after the directional adjustment must be changed in order to maintain constant elevation. This is due to some of the propulsion force having been transferred into lateral-directional force. The change in overall propulsion force may be described as proportional, in some manner, to the degree of tilt, and may be determined using the degree of perturbation of the non-fixed portion in a non-linear or linear manner. It may also be determined using the change, rate of change and rate of rate of change of the degree of perturbation, and may further be based on additional factors. The new force may also consider other factors related to the angle of both the non-fixed portion 210 and the fixed portion 220 relative to a further outside frame, the gravitational direction, or the ground.

When adjusted from the two-dimensional case to the three-dimensional case, the angle θ is replaced with q) where it is the angle between the plane of the non-fixed portion 210 and the plane of the fixed portion 220 of the flight vehicle 200.

A pilot or rider 214 may, in addition to manipulation of the direction of the flight vehicle 200 by movement of the body on the non-fixed portion 210, control flight characteristics such as direction, speed and altitude in other ways. For example, the pilot or rider 214 may engage levers or wheels to impart mechanical change on the flight vehicle 200, such as for example to manipulate a rudder or airplane wing flap to alter some flight characteristic. A pilot or rider 214 may also utilize handheld devices, wireless or otherwise, configured with buttons or levers, to communicate signals to the flight vehicle 200. It is to be understood that many ways of communicating changes or instructions regarding flight characteristics are possible, and that these may be implemented and utilized in addition to the tilting and rotation of the non-fixed portion 210.

In addition to effecting directional changes, tilt and rotation of the non-fixed portion may also be used to effect changes in the speed and altitude of the flight vehicle. For example, the present invention may be configured to recognize that tilting the non-fixed portion 210 may increase or decrease the speed of the flight vehicle 200 in a horizontal direction. In such an example, the more the non-fixed portion 210 is tilted a certain direction, the faster it may be propelled. Conversely, a tilt in the opposing direction may cause propulsion to be adjusted so as to slow the flight vehicle 200.

The basis for this is that the thrusters are facing straight down before tilting, so that all of the force from the thrusters is keeping the flight vehicle 200 at one position. After tilting of the non-fixed portion 210, and the fixed portion 220 tilts to re-orient with the non-fixed portion 210, the new direction of the thrusters is not vertically down, but at an angle. If the propulsive thrust remained the same, the flight vehicle 200 would lose altitude, as not all of the force from the thrusters would be in the vertical, Y-axis direction. However, because the thrusters are themselves tilted following a re-orientation, a portion of that thrust would be in the horizontal, X-axis direction. The thrust of the engines must then increase when the flight vehicle 200 tilts, in order for the vehicle to maintain constant altitude.

The present invention further contemplates that in another embodiment of the present invention, the altitude of the flight vehicle 200 may be adjusted by movement of the bod of the pilot 214, such that no handheld control is needed. Further, specific body movements may signal specific instructions to the flight vehicle 200. In one example of body movement to effect an altitude change, a unique tap, or set of taps, by one or both feet of the pilot may generate a signal to adjust altitude, begin a pre-programmed navigational sequences, or a instruct a command such as "return to launch site." Also, a unique timing between such taps, or duration of pressure or non-pressure of taps during a tap or tap sequence, may also provide certain instructions to the flight vehicle 200. In a further example, a rapid or quick "jolt" on a part (back, front, etc.) of the non-fixed portion 210, followed by a subsequent rapid or quick jolt on another part of the non-fixed portion 210 may provide a signal that the pilot or rider intends to increase or decrease altitude. In such an example, the amount of the increase in altitude may be configured as a function of the timing and spacing of the locations of these rapid or quick jolts. It is contemplated that many examples of the use of specific body movement are possible and may be implemented in the present, and the flight vehicle 200 and the flight vehicle control and stabilization process 100 may be configured in many different ways to recognize such specific body movements.

The systems and methods of the present invention may be implemented in many different computing environments. For example, they may be implemented in conjunction with a special purpose computer, a programmed microprocessor or microcontroller and peripheral integrated circuit element(s), an ASIC or other integrated circuit, a digital signal processor, electronic or logic circuitry such as discrete element circuit, a programmable logic device or gate array such as a PLD, PLA, FPGA, PAL, and any comparable means. In general, any means of implementing the methodology illustrated herein can be used to implement the various aspects of the present invention. Exemplary hardware that can be used for the present invention includes computers, handheld devices, telephones (e.g., cellular, Internet enabled, digital, analog, hybrids, and others), and other such hardware. Some of these devices include processors (e.g., a single or multiple microprocessors), memory, nonvolatile storage, input devices, and output devices. Furthermore, alternative software implementations including, but not limited to, distributed processing, parallel processing, or virtual machine processing can also be configured to perform the methods described herein.

The systems and methods of the present invention may also be partially implemented in software that can be stored on a storage medium, non-transitory or otherwise, executed on programmed general-purpose computer with the cooperation of a controller and memory, a special purpose computer, a microprocessor, or the like. In these instances, the systems and methods of this invention can be implemented as a program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Additionally, the data processing functions disclosed herein may be performed by one or more program instructions stored in or executed by such memory, and further may be performed by one or more modules configured to carry out those program instructions. Modules are intended to refer to any known or later developed hardware, software, firmware, artificial intelligence, fuzzy logic, expert system or combination of hardware and software that is capable of performing the data processing functionality described herein.

The foregoing descriptions of embodiments of the present invention have been presented for the purposes of illustration and description. It is not intended to be exhaustive or to limit the invention to the precise forms disclosed. Accordingly, many alterations, modifications and variations are possible in light of the above teachings, may be made by those having ordinary skill in the art without departing from the spirit and scope of the invention. It is therefore intended that the scope of the invention be limited not by this detailed description. For example, notwithstanding the fact that the elements of a claim are set forth below in a certain combination, it must be expressly understood that the invention includes other combinations of fewer, more or different elements, which are disclosed in above even when not initially claimed in such combinations. It is to be understood that many different mathematical equations, functions, manipulations, and models may be used to accomplish the underlying premise that the fixed portion 220 is re-oriented relative to the non-fixed portion 210 of the flight vehicle 200 after a perturbation in the planar position of the non-fixed portion from one or both of tilt and rotation thereof.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a sub-combination or variation of a sub-combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

The invention claimed is:

1. A flight vehicle comprising:
a fixed portion comprising at least one force-generating device from lift, propulsion, or thrust; and
a non-fixed portion, the non-fixed portion connected to the fixed portion so as to at least one of tilt and rotate relative to the fixed portion; and
at least one sensor adapted to detect a change in a position of the non-fixed portion relative to the fixed portion, including a change resulting from at least one of a tilt in planar orientation of the non-fixed portion in any direction and a rotation of the non-fixed portion about an axis perpendicular to the fixed portion;
wherein the non-fixed portion is adapted to hold a rider in a standing, sitting, or reclined or prone position and to be tilted by a forward, backward, or angular motion of the rider in a direction transverse to a planar axis of the non-fixed portion, to be rotated by a left or right motion of the rider along the planar axis of the non-fixed portion, or both.

2. The flight vehicle of claim 1, further comprising circuitry adapted to receive a signal from at least one of the sensors, and in response, to induce an adjustment in the fixed portion.

3. The flight vehicle of claim 2, wherein the circuitry is further adapted to at least one of: move the fixed portion so that the resulting planar orientation of the fixed portion is closer to the planar orientation of the non-fixed portion, and rotate the fixed portion in the same direction as the rotation of the non-fixed portion so as to reduce a relative difference in orientation between the fixed portion and the non-fixed portion.

4. The flight vehicle of claim 1, wherein the non-fixed portion is suspended from the fixed portion using a connector including at least one of: a spring, a hydraulic system, a hinge, rubber coupling mechanisms or pads, chains, or cables, and magnets.

5. The flight vehicle of claim 1, wherein at least part of the non-fixed portion is positioned above, level with, on top of, or flush with the fixed portion, using a connector including at least one of: a plurality of springs, hydraulic systems, hinges, rubber coupling mechanisms or pads, chains, cables, and magnets.

6. The flight vehicle of claim 1, wherein the non-fixed portion comprises a platform of force sensors.

7. The flight vehicle of claim 1, wherein the non-fixed portion comprises a wheel, handle bars or other handheld devices, wireless or wired, configured with buttons or levers, to communicate signals to the flight vehicle, or where a unique set of taps, or other signals, can be inputs to the flight vehicle, wherein inputs may impart mechanical change on the flight vehicle.

8. The flight vehicle of claim 1, wherein the sensor comprises at least one of: a device adapted to measure a compression of a spring, a device to measure vibrations in a tensile coupling mechanism coupling the fixed portion to the non-fixed portion, a gyroscope, an accelerometer, an inertial measurement unit, an electromagnetic wave-based measurement device, a sonar-based device, magnets, force sensors, distance sensors, and mechanical components.

9. The flight vehicle of claim 1, wherein the flight vehicle comprises at least one sensor adapted to detect a change in a position of the non-fixed portion relative to the fixed portion and sensors are positioned in at least one location on at least one of the fixed portion or the non-fixed portion of the flight vehicle.

10. The flight vehicle of claim 1, wherein the flight vehicle comprises at least one sensor adapted to detect a change in a position of the non-fixed portion relative to the fixed portion and sensors may have a paired sensor, where a sensor on a non-fixed portion is paired with a sensor on a fixed portion, where a parameter is measured between sensors or to a point on the non-fixed or the fixed portion of the flight vehicle.

11. The flight vehicle of claim 9, wherein through the at least one sensor and the non-fixed portion, a determination of at least one of a center of mass or a shift in the center of mass of a rider or payload is made.

12. A flight vehicle comprising:
a fixed portion comprising at least one force-generating device from lift, propulsion, or thrust; and
a non-fixed portion, the non-fixed portion connected to the fixed portion so as to at least one of tilt and rotate relative to the fixed portion; and
at least one sensor adapted to detect a change in a position of the non-fixed portion relative to the fixed portion, including a change resulting from at least one of a tilt in planar orientation of the non-fixed portion in any direction and a rotation of the non-fixed portion about an axis perpendicular to the fixed portion;
wherein the non-fixed portion is adapted to hold a human rider in a standing, sitting, or reclined or prone position in a pilot seat, rider or passenger seat or medical bed, wherein at least one of a tilt, lean, rotation, center of mass or change in center of mass is detected and may be used as an input to at least one of the vehicle system, flight dynamics, and control while the flight vehicle performs autonomous or remote piloted flight.

13. The flight vehicle of claim 12, further comprising circuitry adapted to receive a signal from at least one of the sensors, and in response, to induce an adjustment in the fixed portion.

14. The flight vehicle of claim 13, wherein the circuitry is further adapted to at least one of: move the fixed portion so that the resulting planar orientation of the fixed portion is closer to the planar orientation of the non-fixed portion, and rotate the fixed portion in the same direction as the rotation of the non-fixed portion so as to reduce a relative difference in orientation between the fixed portion and the non-fixed portion.

15. The flight vehicle of claim 12, wherein the non-fixed portion is attached to the fixed portion using a connector including at least one of: a spring, a hydraulic system, a hinge, rubber coupling mechanisms or pads, chains, or cables, and magnets.

16. The flight vehicle of claim 12, wherein at least part of the non-fixed portion is positioned above, level with, on top of, or flush with the fixed portion, using a connector including at least one of: a plurality of springs, hydraulic systems, hinges, rubber coupling mechanisms or pads, chains, cables, and magnets.

17. The flight vehicle of claim 12, wherein the non-fixed portion comprises a platform.

18. The flight vehicle of claim 12, wherein the non-fixed portion comprises a wheel, handle bars or other handheld devices, wireless or wired, configured with buttons or levers, to communicate signals to the flight vehicle, or where a unique set of taps, or other signals, can be inputs to the flight vehicle, wherein inputs may impart mechanical change on the flight vehicle.

19. The flight vehicle of claim 12, wherein the sensor comprises at least one of: a device adapted to measure a compression of a spring, a device to measure vibrations in a tensile coupling mechanism coupling the fixed portion to the non-fixed portion, a gyroscope, an accelerometer, an inertial measurement unit, an electromagnetic wave-based measurement device, an electromagnetic wave based device including a camera or optical device, or electromagnetic wave-based device in a visible spectrum, a sonar-based device, magnets, force sensors, distance sensors, and mechanical components.

20. The flight vehicle of claim 12, wherein sensors comprise at least one of: a device adapted to measure a compression of a spring, a device to measure vibrations in a tensile coupling mechanism, a gyroscope, an accelerometer, an inertial measurement unit, an electromagnetic wave-based measurement device, an electromagnetic wave based device including a camera or optical device, or electromagnetic wave-based device in a visible spectrum, a sonar-based device, magnets, force sensors, distance sensors that are on a non-fixed portion or the fixed portion, and measure or perceive or detect at least one of a tilt, movement or rotation directly from a user or rider by being directly affected by a user or rider.

21. The flight vehicle of claim 12, wherein the flight vehicle comprises at least one sensor adapted to detect a change in a position of the non-fixed portion relative to the fixed portion and sensors are positioned in at least on location on at least one of the fixed portion or the non-fixed portion of the flight vehicle.

22. The flight vehicle of claim 12, wherein the flight vehicle comprises at least one sensor adapted to detect a change in a position of the non-fixed portion relative to the fixed portion and sensors may have a paired sensor, where a sensor on a non-fixed portion is paired with a sensor on a fixed portion, where a parameter is measured between sensors or to a point on the non-fixed or the fixed portion of the flight vehicle.

23. The flight vehicle of claim 12, wherein through the at least one sensor and the non-fixed portion, a determination of at least one of a center of mass or a shift in the center of mass of a rider is made.

\* \* \* \* \*